US012619210B2

(12) United States Patent
Shimoyama

(10) Patent No.: US 12,619,210 B2
(45) Date of Patent: May 5, 2026

(54) STATE-MONITORING DEVICE AND STATE-MONITORING METHOD

(71) Applicant: NTN Corporation, Osaka (JP)

(72) Inventor: Yota Shimoyama, Kuwana (JP)

(73) Assignee: NTN Corporation, Osaka (JP)

( * ) Notice: Subject to any disclaimer, the term of this patent is extended or adjusted under 35 U.S.C. 154(b) by 505 days.

(21) Appl. No.: 18/026,099

(22) PCT Filed: Sep. 27, 2021

(86) PCT No.: PCT/JP2021/035274
§ 371 (c)(1),
(2) Date: Mar. 13, 2023

(87) PCT Pub. No.: WO2022/071189
PCT Pub. Date: Apr. 7, 2022

(65) Prior Publication Data
US 2023/0367283 A1 Nov. 16, 2023

(30) Foreign Application Priority Data

Sep. 30, 2020 (JP) ................................. 2020-165518

(51) Int. Cl.
*G05B 19/042* (2006.01)

(52) U.S. Cl.
CPC .. *G05B 19/0428* (2013.01); *G05B 2219/2619* (2013.01)

(58) Field of Classification Search
CPC ........ G05B 19/0428; G05B 2219/2619; G05B 23/024; Y02E 10/72
See application file for complete search history.

(56) References Cited

U.S. PATENT DOCUMENTS 10,181,101 B2 * 1/2019 Zhang ...................... F03D 7/048
10,288,043 B2 * 5/2019 Yu ........................... G06N 20/00
(Continued)

FOREIGN PATENT DOCUMENTS

CN 101269769 A 9/2008
CN 103761372 A 4/2014
(Continued)

OTHER PUBLICATIONS

Stetco, Adrian, et al. "Machine learning methods for wind turbine condition monitoring: A review." Renewable energy 133 (2019): 620-635. (Year: 2019).*
(Continued)

*Primary Examiner* — Christopher E. Everett
(74) *Attorney, Agent, or Firm* — Rimon P.C.

(57) ABSTRACT

A diagnosis-parameter calculation unit calculates a diagnosis parameter in a second time period, based on sensing data obtained in the second time period. A characteristic-data input unit obtains characteristic data representing characteristics of a monitoring target device in a first time period and the second time period, from a logger included in the monitoring target device. Using the characteristic data in the second time period and the diagnosis parameter in the second time period, a regression-model generation unit) generates a regression model representing a relationship between the characteristic data and the diagnosis parameter. Using the regression model, a diagnosis-parameter estimation unit estimates a diagnosis parameter in the first time period, which corresponds to the characteristic data in the first time period. Using the diagnosis parameters in the first time period and the second time period, the diagnosis-criteria setting unit sets diagnosis criteria.

8 Claims, 16 Drawing Sheets

(56) References Cited

U.S. PATENT DOCUMENTS

| | | | |
|---|---|---|---|
| 2011/0238258 A1 | 9/2011 | Singh et al. | |
| 2014/0343895 A1 | 11/2014 | Hencken et al. | |
| 2015/0116131 A1 | 4/2015 | Ikeda et al. | |
| 2016/0076970 A1 | 3/2016 | Takahashi | |
| 2018/0187648 A1* | 7/2018 | Spruce | F03D 7/0292 |
| 2019/0203696 A1* | 7/2019 | Kaucic | F03D 7/046 |
| 2019/0257716 A1 | 8/2019 | Takahashi | |
| 2019/0294998 A1* | 9/2019 | Kloepper | G06N 20/00 |
| 2020/0347824 A1* | 11/2020 | Yu | F03D 7/0292 |
| 2021/0262689 A1* | 8/2021 | Shinde | F24F 11/64 |

FOREIGN PATENT DOCUMENTS

| | | | |
|---|---|---|---|
| CN | 104081301 A | 10/2014 | |
| CN | 108136587 A | 6/2018 | |
| EP | 3074824 B1 | 5/2019 | |
| JP | 2004-133553 A | 4/2004 | |
| JP | 2013-185507 A | 9/2013 | |
| JP | 2013-242637 A | 12/2013 | |
| JP | 2015-103218 A | 6/2015 | |
| JP | 2016-008536 A | 1/2016 | |
| JP | 2016-062258 A | 4/2016 | |
| JP | 2017-181138 A | 10/2017 | |
| JP | 2019-212195 A | 12/2019 | |
| WO | 2012/009804 A1 | 1/2012 | |

OTHER PUBLICATIONS

Schlechtingen, Meik, and Ilmar Ferreira Santos. "Comparative analysis of neural network and regression based condition monitoring approaches for wind turbine fault detection." Mechanical systems and signal processing 25.5 (2011): 1849-1875. (Year: 2011).*

International Search Report issued in International Application No. PCT/JP2021/035274 dated Nov. 22, 2021, with English translation.

Lei, Z et al. "The Research of Wind Turbine Condition Monitoring Based on ANFIS", Journal of South Central University for Nationalities (Nat. Sci. Edition), vol. 36, No. 1, Mar. 15, 2017 (English abstract).

Tianyun, S. et al. "Discussion on the Overall Scheme for FMS Condition Monitoring and Fault Diagnosis", Manufacturing Automation, 04, Dec. 15, 1997 (English abstract).

* cited by examiner

FIG.3

DATE

DATE

DATE

MAIN SHAFT'S RPM

VIBRATION
ROOT MEAN
SQUARE

MAIN SHAFT'S ROTATIONAL SPEED

VIBRATION
ROOT MEAN
SQUARE

1/1    2/20    4/10    5/30    7/19    9/7

DATE

FIG.15

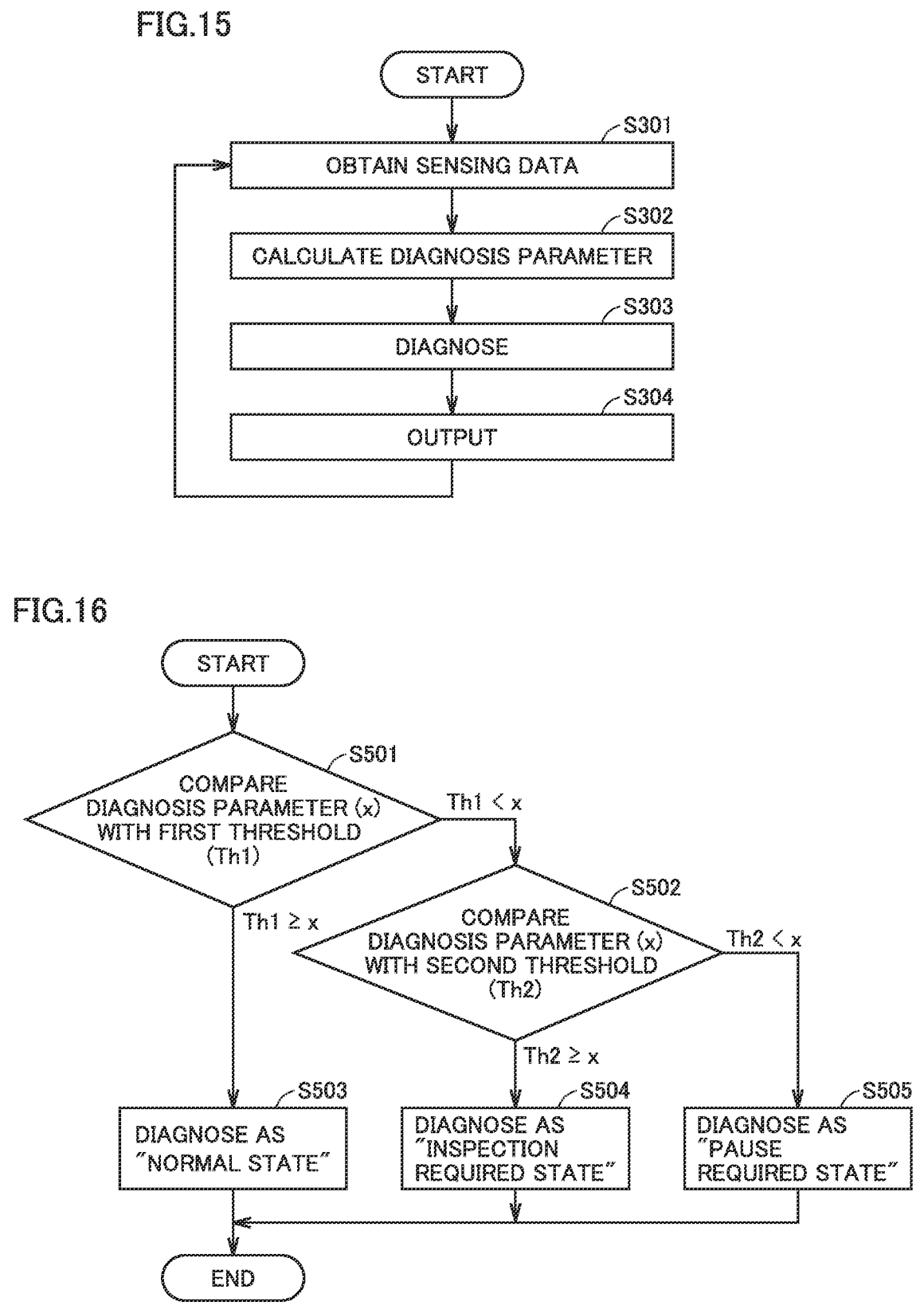

START

S301
OBTAIN SENSING DATA

S302
CALCULATE DIAGNOSIS PARAMETER

S303
DIAGNOSE

S304
OUTPUT

FIG.16

START

S501
COMPARE DIAGNOSIS PARAMETER (x) WITH FIRST THRESHOLD (Th1)

Th1 < x

Th1 ≥ x

S502
COMPARE DIAGNOSIS PARAMETER (x) WITH SECOND THRESHOLD (Th2)

Th2 < x

Th2 ≥ x

S503
DIAGNOSE AS "NORMAL STATE"

S504
DIAGNOSE AS "INSPECTION REQUIRED STATE"

S505
DIAGNOSE AS "PAUSE REQUIRED STATE"

END

FIG.18

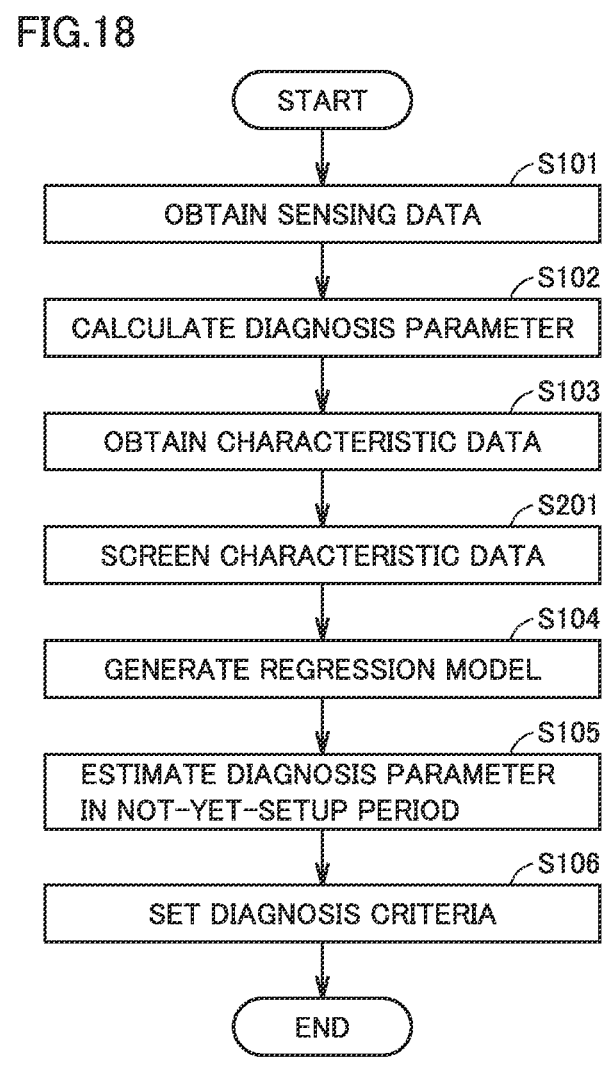

```
                    ┌──────────┐
                    │  START   │
                    └──────────┘
                         │
                         ▼           ┌─S101
        ┌─────────────────────────────────┐
        │      OBTAIN SENSING DATA         │
        └─────────────────────────────────┘
                         │
                         ▼           ┌─S102
        ┌─────────────────────────────────┐
        │   CALCULATE DIAGNOSIS PARAMETER  │
        └─────────────────────────────────┘
                         │
                         ▼           ┌─S103
        ┌─────────────────────────────────┐
        │    OBTAIN CHARACTERISTIC DATA    │
        └─────────────────────────────────┘
                         │
                         ▼           ┌─S201
        ┌─────────────────────────────────┐
        │   SCREEN CHARACTERISTIC DATA     │
        └─────────────────────────────────┘
                         │
                         ▼           ┌─S104
        ┌─────────────────────────────────┐
        │    GENERATE REGRESSION MODEL     │
        └─────────────────────────────────┘
                         │
                         ▼           ┌─S105
        ┌─────────────────────────────────┐
        │  ESTIMATE DIAGNOSIS PARAMETER    │
        │    IN NOT-YET-SETUP PERIOD       │
        └─────────────────────────────────┘
                         │
                         ▼           ┌─S106
        ┌─────────────────────────────────┐
        │      SET DIAGNOSIS CRITERIA      │
        └─────────────────────────────────┘
                         │
                         ▼
                    ┌──────────┐
                    │   END    │
                    └──────────┘
```

FIG.20

STATE-MONITORING DEVICE AND STATE-MONITORING METHOD

CROSS-REFERENCE OF RELATED APPLICATIONS

This application is the U.S. National Phase under 35 U.S.C. § 371 of International Patent Application No. PCT/JP2021/035274, filed on Sep. 27, 2021, which in turn claims the benefit of Japanese Patent Application No. 2020-165518, filed on Sep. 30, 2020, the entire disclosures of which Applications are incorporated by reference herein.

TECHNICAL FIELD

The present invention relates to a state-monitoring device and a state-monitoring method, and, more particularly, to a state-monitoring device and a state-monitoring method for monitoring the state of rotating equipment, for example.

BACKGROUND ART

Conventionally, an apparatus is known which sets diagnosis criteria based on measurement data representing a state of equipment, and diagnoses the state of the equipment according to the diagnosis criteria.

For example, the state-monitoring system disclosed in PTL 1 diagnoses abnormality of equipment provided in a wind power generator, the state-monitoring system including: a monitor device which includes multiple sensors for measuring measurement data indicating the state of the equipment and operating conditions data indicating operating conditions of the wind power generator and calculates a diagnosis parameter from the measurement data; a monitoring-side control device which includes a storage unit storing information, sets a first threshold for diagnosing the abnormality of the equipment, and diagnoses the abnormality of the equipment based on the first threshold; and a monitoring terminal device which includes a display unit for displaying information, and monitors the state of the equipment. The monitoring-side control device is coupled to the monitor device and the monitoring terminal device by communications lines. The monitoring terminal device sequentially sets a first time period for collecting underlying data, a second time period for setting the first threshold, and a third time period for diagnosing the abnormality of the equipment. During the first time period, the measurement data, operating conditions data, and diagnosis parameter measured and calculated by the monitor device are stored into the storage unit and displayed on the display unit, and diagnostic operating conditions are set using the monitoring terminal device. During the second time period, the diagnosis parameter, calculated from the measurement data measured when the operating conditions for the wind power generator meet the diagnostic operating conditions, is stored into the storage unit, and the monitoring-side control device generates the first threshold based on the diagnosis parameter stored in the storage unit. During the third time period, the diagnosis parameter, calculated from the measurement data measured when the operating conditions for the wind power generator meet the diagnostic operating conditions, is stored into the storage unit, and the monitoring-side control device compares the diagnosis parameter stored in the storage unit with the first threshold, determines that the equipment is subject to abnormality if the diagnosis parameter is greater than the first threshold, and a result of the determination is stored into the storage unit and displayed on the display unit.

CITATION LIST

Patent Literature

PTL 1: Japanese Patent Laying-Open No. 2013-185507

SUMMARY OF INVENTION

Technical Problem

PTL 1 requires data in order to set the diagnosis criteria. The abnormality of the equipment cannot be diagnosed during an adjustment period in which the state-monitoring device is set up and the diagnosis criteria are set based on the data. Accordingly, a short adjustment period is preferable.

However, if the state of the monitoring target device in the operational period differs from that in the adjustment period, the state-monitoring system may determine that the monitoring target device is subject to abnormality even though the monitoring target device is in a normal state. Thus, it is necessary to extend the adjustment period so that the diagnosis criteria can be set base on as many states as possible of the monitoring target device.

For the reasons stated above, conventionally, the adjustment period and the diagnostic accuracy are in trade off.

Therefore, an object of the present invention is to provide a state-monitoring device and a state-monitoring method which require a short adjustment period and are capable of accurate diagnosis.

Solution to Problem

The present invention is a state-monitoring device connectable to a monitoring target device. A first time period, a second time period, and a third time period are set, the first time period being a time period before the monitoring target device is connected to the state-monitoring device, the second time period being a preparation period, after the monitoring target device is connected to the state-monitoring device, for diagnosing abnormality of the monitoring target device, the third time period being a time period, after the monitoring target device is connected to the state-monitoring device, during which abnormality of the monitoring target device is diagnosed. the state-monitoring device, includes: a sensing-data input unit that obtains, during the second time period and the third time period, sensing data representing a state of the monitoring target device from a sensor included in the monitoring target device; a diagnosis-parameter calculation unit that calculates a diagnosis parameter in the second time period and a diagnosis parameter in the third time period based on the sensing data obtained during the second time period and the third time period; a characteristic-data input unit that obtains characteristic data representing characteristics of the monitoring target device in the first time period and the second time period from a logger included in the monitoring target device; a regression-model generation unit that generates, using the characteristic data in the second time period and the diagnosis parameter in the second time period, a regression model representing a relationship between the characteristic data and the diagnosis parameter; a diagnosis-parameter estimation unit that estimates, using the regression model, a diagnosis parameter in the first time period, which corresponds to the characteristic data in the first time period;

a diagnosis-criteria setting unit that sets diagnosis criteria, using the diagnosis parameter in the first time period and the diagnosis parameter in the second time period; and a diagnostic unit that diagnoses abnormality of the monitoring target device, based on the diagnosis parameter in the third time period and the diagnosis criteria.

The present invention is a state-monitoring method in a state-monitoring device connectable to a monitoring target device. A first time period, a second time period, and a third time period are set, the first time period being a time period before the monitoring target device is connected to the state-monitoring device, the second time period being a preparation period, after the monitoring target device is connected to the state-monitoring device, for diagnosing abnormality of the monitoring target device, the third time period being a time period, after the monitoring target device is connected to the state-monitoring device, during which abnormality of the monitoring target device is diagnosed. The state-monitoring method includes: obtaining, by the monitoring target device, during the second time period, sensing data representing a state of the monitoring target device from a sensor included in the monitoring target device; calculating, by the state-monitoring device, a diagnosis parameter in the second time period based on the sensing data obtained during the second time period; obtaining, by the state-monitoring device, characteristic data representing characteristics of the monitoring target device in the first time period and the second time period from a logger included in the monitoring target device; generating, by the state-monitoring device, using the characteristic data in the second time period and the diagnosis parameter in the second time period, a regression model representing a relationship between the characteristic data and the diagnosis parameter; estimating, by the state-monitoring device, using the regression model, a diagnosis parameter in the first time period, which corresponds to the characteristic data in the first time period; setting, by the state-monitoring device, diagnosis criteria, using the diagnosis parameter in the first time period and the diagnosis parameter in the second time period, and obtaining, by the state-monitoring device, during the third time period, the sensing data representing the state of the monitoring target device from the sensor included in the monitoring target device; calculating, by the state-monitoring device, a diagnosis parameter in the third time period, based on the sensing data obtained in the third time period; and diagnosing, by the state-monitoring device, abnormality of the monitoring target device, based on the diagnosis parameter in the third time period and the diagnosis criteria.

Advantageous Effects of Invention

According to the present invention, adjustment period can be reduced, while maintaining the diagnostic accuracy. Thus, a time period can be reduced which is required for the state-monitoring device to be set up and the state-monitoring system to transition to the operating state during which the state-monitoring system can diagnose the monitoring target device.

BRIEF DESCRIPTION OF DRAWINGS

FIG. 3 is a diagram representing state transitions of the state-monitoring system according to Embodiment 1.
FIG. 15 is a flowchart representing process steps performed by the state-monitoring system according to Embodiment 1 in the operating state.
FIG. 16 is a flowchart showing a procedure for diagnosis made by the state-monitoring system according to Embodiment 1.
FIG. 18 is a flowchart representing process steps performed by the state-monitoring system according to Embodiment 2 in an adjusting state.
FIG. 20 is a flowchart representing process steps performed by the state-monitoring system according to Embodiment 3 in an adjusting state.

DESCRIPTION OF EMBODIMENTS

Hereinafter, embodiments will be described, with reference to the accompanying drawings.

Embodiment 1

Figure 1:
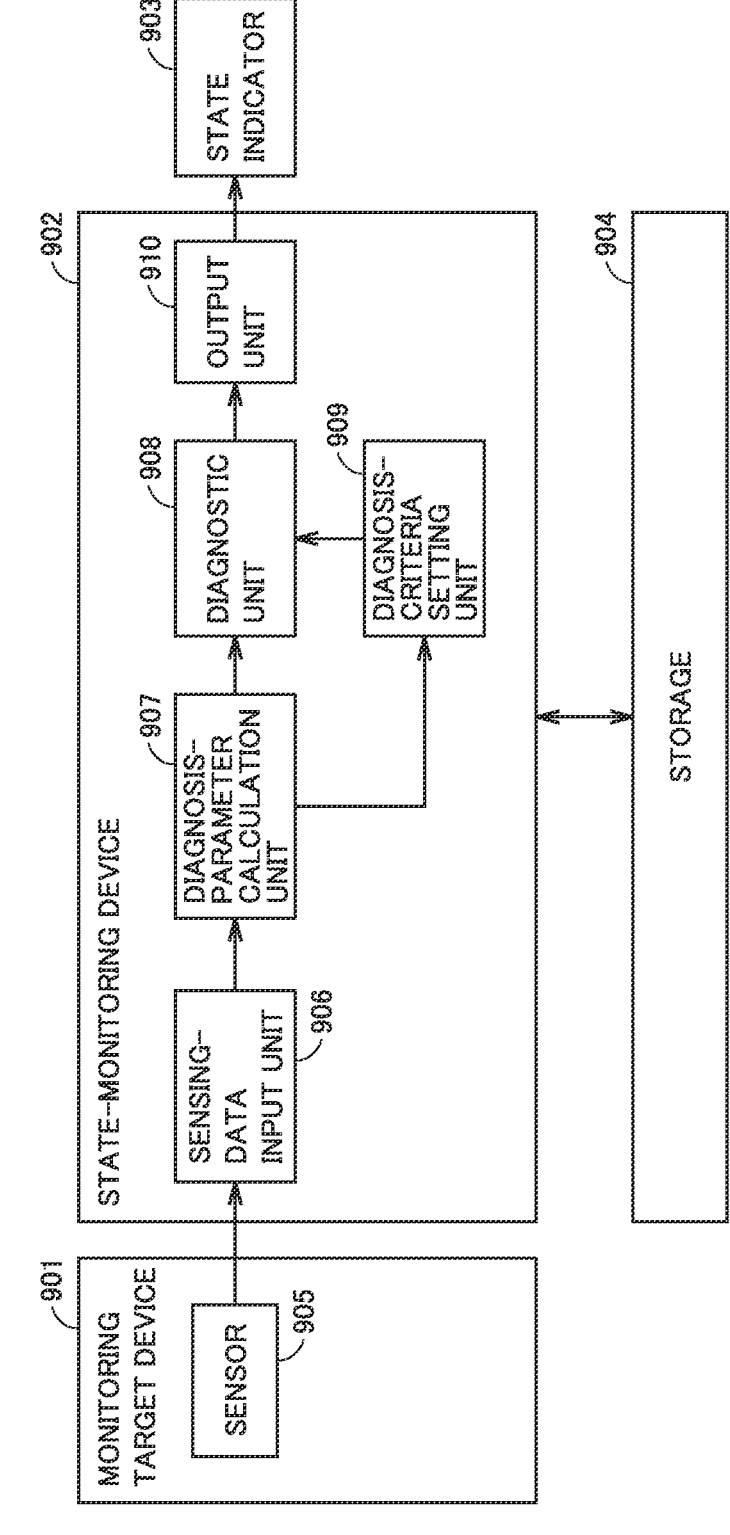
FIG. 1 is a diagram representing a configuration example of a general state-monitoring system.
Figure 2:
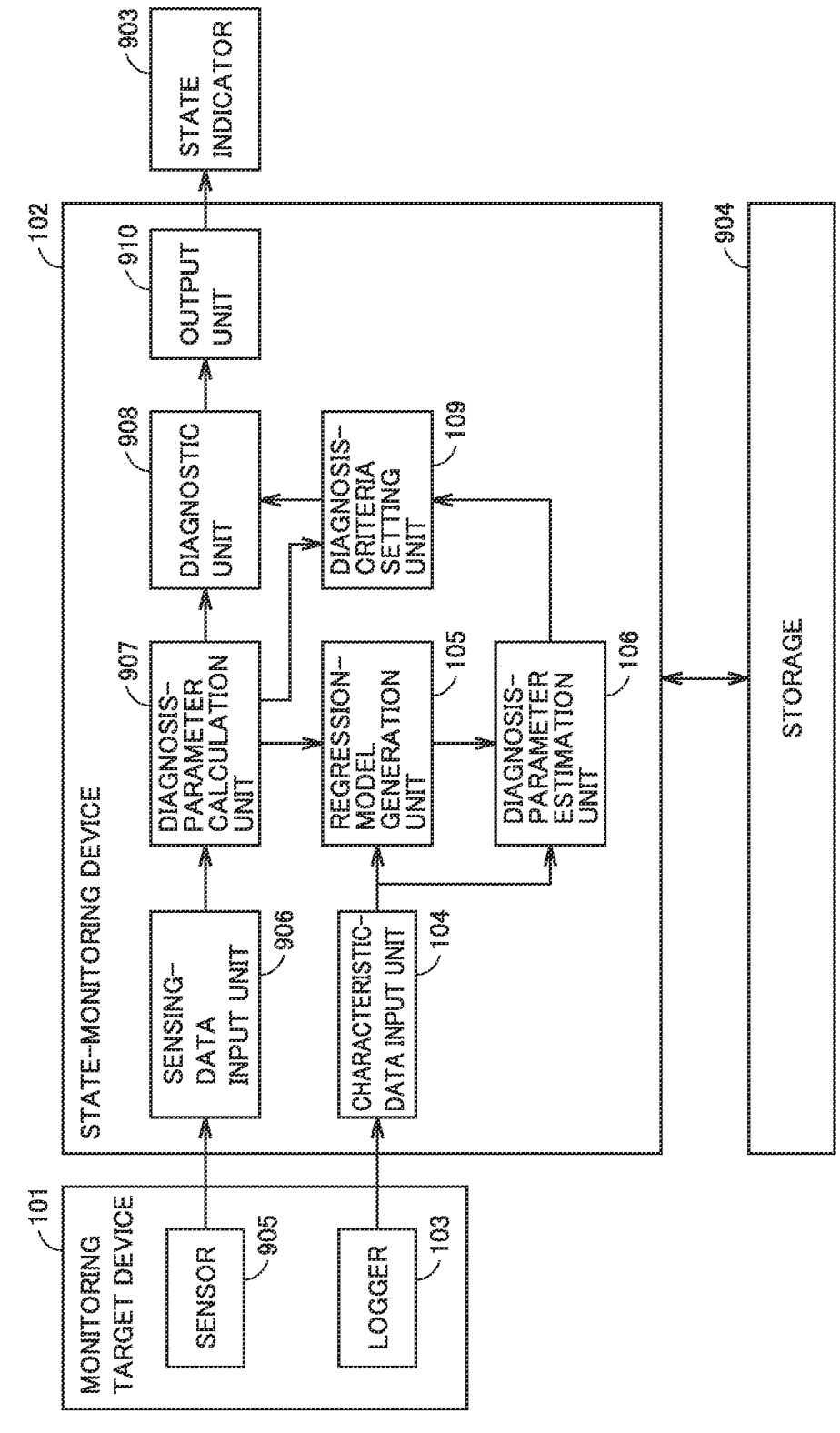
FIG. 2 is a diagram representing a configuration example of a state-monitoring system according to Embodiment 1.

(Configuration of State-Monitoring System)
FIG. 1 is a diagram representing a configuration example of a general state-monitoring system. FIG. 2 is a diagram representing a configuration example of a state-monitoring system according to Embodiment 1.
As shown in FIG. 1, the general state-monitoring system includes a monitoring target device 901, a state-monitoring device 902, a state indicator 903, and a storage 904. The monitoring target device 901 includes a sensor 905. The state-monitoring device 902 includes a sensing-data input unit 906, a diagnosis-parameter calculation unit 907, a diagnostic unit 908, a diagnosis-criteria setting unit 909, and an output unit 910.

As shown in FIG. 2, the state-monitoring system according to the present embodiment includes a monitoring target device 101, a state-monitoring device 102, a state indicator 903, and a storage 904.

The monitoring target device 101 is the same as the monitoring target device 901 except that the monitoring target device 101 further includes a logger 103. The state-monitoring device 102 is the same as the state-monitoring device 902 except that the state-monitoring device 102 further includes a characteristic-data input unit 104, a regression-model generation unit 105, and a diagnosis-parameter estimation unit 106.

In the present embodiment, an adjustment period can be reduced, while maintaining the diagnostic accuracy, by exploiting the information from the logger 103 which is not the case for the general state-monitoring system.

The monitoring target device 101 is a target device to be monitored with respect to its state and diagnosed by the state-monitoring device 102. The monitoring target device 101 is, for example, wind power generation equipment, a production facility, or a machine tool.

The sensor 905 is mounted on the monitoring target device 101. The sensor 905 measures physical quantities of the monitoring target device 101, such as the acceleration, the temperature, and the current. The sensor 905 is, for example, an acceleration sensor, a temperature sensor, or a proximity sensor.

The storage 904 saves the data input to the state-monitoring device 102, for example. The storage 904 is, for example, a nonvolatile memory built in the state-monitoring device 102, or a server connected to the state-monitoring device 102 through the Internet.

The state indicator 903 shows a diagnostic result provided by the state-monitoring device 102. The state indicator 903 is, for example, an indicator panel (an indicator light) mounted on the monitoring target device 101.

The logger 103 is equipment or a medium holding characteristic data of the monitoring target device 101. The logger 103 is not necessary built in the monitoring target device 101. The logger 103 is, for example, a control device (such as a memory of a programmable logic controller (PLC) or a supervisory control and data acquisition (SCADA)), or any other state-monitoring device.

(State Transitions of State-Monitoring System)

Figure 3:
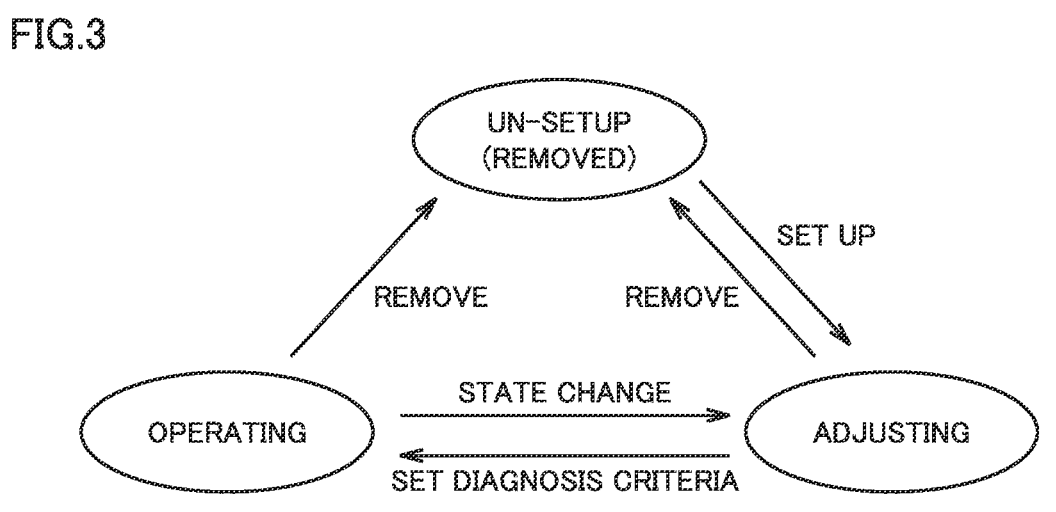

FIG. 3 is a diagram representing state transitions of the state-monitoring system according to Embodiment 1.

The state-monitoring system has three states.

A un-setup state refers to a state in which the state-monitoring device 102 is not set up and the state-monitoring device 102 and the monitoring target device 101 are not connected together.

An adjusting state refers to a state in which the state-monitoring device 102 and the monitoring target device 101 are connected together, and the state-monitoring device 102 collects sensing data and characteristic data for the monitoring target device 101, and sets diagnosis criteria. In the adjusting state, the monitoring target device 101 is not diagnosed.

An operating state refers to a state in which the state-monitoring device 102 and the monitoring target device 101 are connected together, the state-monitoring device 102 collects the sensing data for the monitoring target device 101, and the monitoring target device 101 is diagnosed based on the set diagnosis criteria.

The set up refers to a state in which the state-monitoring device 102 is set up and the state-monitoring device 102 and the monitoring target device 101 are connected together. As being set up, the state-monitoring device 102 transitions from the un-setup state to the adjusting state.

Remove refers to disconnecting and removing the state-monitoring device 102 from the monitoring target device 101. This causes the state-monitoring device 102 to transition from the adjusting state or the operating state to the un-setup state.

As the diagnosis criteria are set, the state-monitoring device 102 transitions from the adjusting state to the operating state.

The state change refers to a situation in which there are changes in the state-monitoring device 102 and its surrounding components, and the diagnosis criteria are thus rendered unsuitable. The state change refers to, for example, maintenance of the monitoring target device 101 or exchange of the sensor. The state change causes the state-monitoring device 102 to transition from the operating state to the adjusting state.

In the present embodiment, a time period in which the state-monitoring device 102 is in the un-setup state will be referred to as a first time period, a time period in which the state-monitoring device 102 is in the adjusting state will be referred to as a second time period, and a time period in which the state-monitoring device 102 is in the operating state will be referred to as a third time period. In other words, the first time period, the second time period, and the third time period are set for the state-monitoring device 102, where the first time period is a time period before the monitoring target device 101 is connected to the state-monitoring device 102, the second time period is a preliminary period, after the monitoring target device 101 is connected to the state-monitoring device 102, for diagnosing abnormality of the monitoring target device 101, and the third time period is a time period, after the monitoring target device 101 is connected to the state-monitoring device 102, during which the state-monitoring device 102 diagnoses abnormality of the monitoring target device 101.

In the present embodiment, the state-monitoring device 102 is allowed to quickly transition to the operating state by reducing the time period (the second time period) during which the state-monitoring device 102 is in the adjusting state.

Referring, again, to FIG. 2, during the second time period (the adjustment period) and the third time period (an operational period), the sensing-data input unit 906 obtains the sensing data representing the state of the monitoring target device 101, from the sensor 905 included in the monitoring target device 101.

Based on the sensing data obtained during the second time period (the adjustment period) and the third time period (the operational period), the diagnosis-parameter calculation unit 907 calculates diagnosis parameters in the second time period (the adjustment period) and the third time period (the operational period).

The characteristic-data input unit 104 obtains, from the logger 103 included in the monitoring target device 101, the characteristic data representing characteristics of the monitoring target device during the first time period (a not-yet-setup period) and the second time period (the adjustment period).

Using the characteristic data at a time ti in the second time period (the adjustment period) and the diagnosis parameter at a time ti in the second time period (the adjustment period) (where i=1 to n), the regression-model generation unit 105 generates a regression model representing a relationship between the characteristic data and the diagnosis parameter.

Using the regression model, the diagnosis-parameter estimation unit 106 estimates a diagnosis parameter in the first time period (the not-yet-setup period), which corresponds to the characteristic data in the first time period (the not-yet-setup period).

Using the diagnosis parameters in the first time period (the not-yet-setup period) and the second time period (the adjustment period), the diagnosis-criteria setting unit 109 sets the diagnosis criteria.

The diagnostic unit 908 diagnoses the abnormality of the monitoring target device 101, based on the diagnosis parameter in the third time period (the operational period) and the diagnosis criteria set by the diagnosis-criteria setting unit 109.

The output unit 910 outputs a diagnostic result made by 908.

(Adjustment Data)

Figure 4:
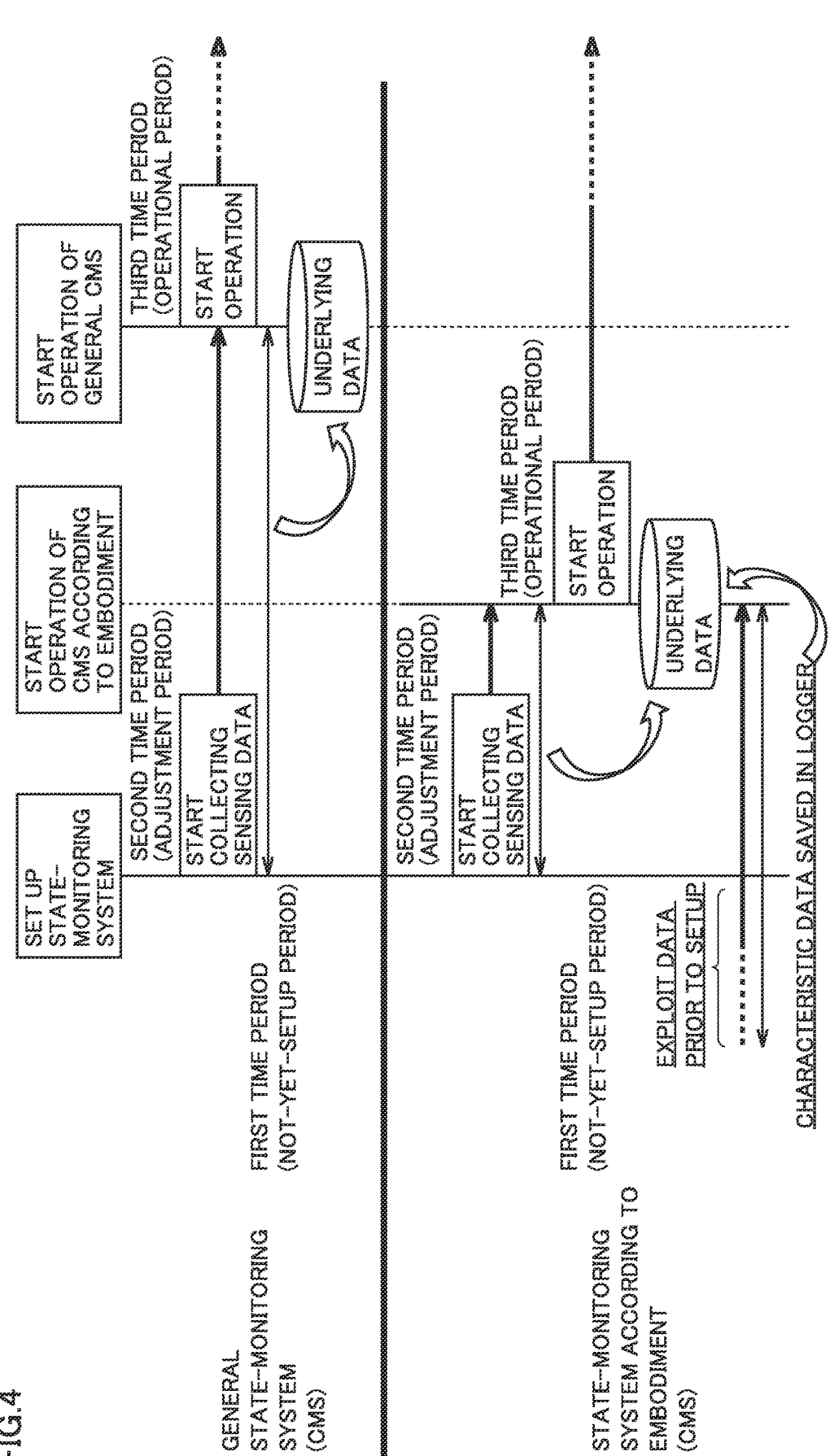
FIG. 4 is a diagram showing exploiting of data in the general state-monitoring system versus exploiting of data in the state-monitoring system according to the present embodiment.

FIG. 4 is a diagram showing exploiting of data in the general state-monitoring system versus exploiting of data in the state-monitoring system according to the present embodiment.

In the general state-monitoring system, the underlying data used by the diagnosis-criteria setting unit 909 to set the diagnosis criteria is the diagnosis parameter that is calculated based on the sensing data output from the sensor 905 in the second time period (the adjustment period).

In the state-monitoring system according to the present embodiment, the underlying data used by the diagnosis-criteria setting unit 109 to set the diagnosis criteria is the diagnosis parameter calculated based on the sensing data output from the sensor 905 in the second time period (the adjustment period) and the diagnosis parameter in the first time period (the not-yet-setup period) estimated from the characteristic data in the first time period (the not-yet-setup period).

As the underlying data, the adjustment procedure performed by the general state-monitoring system uses only the diagnosis parameter calculated based on the sensing data output from the sensor 905 in the adjustment period, and thus has the following problems.

First, in order to set correct diagnosis criteria, a large number of sensing data is required. As a result, it requires a longer time period (the adjustment period) for the state-monitoring system to transition from the adjusting state to the operating state.

Second, if the adjustment period is forcefully reduced, the underlying data for setting the diagnosis criteria decreases. As a result, correct diagnosis criteria are highly unlikely to be set.

Third, if the state of the monitoring target device is skewed during the adjustment period, the underlying data may be skewed. As a result, correct diagnosis criteria cannot be set.

Fourth, there is few ways to evaluate how many states, out of the variety of states of the monitoring target device 101, the underlying data can cover. As a result, a suitable adjustment period cannot be set.

In the present embodiment, the above problems can be solved by adding to the underlying data the diagnosis parameter in the not-yet-setup period estimated from characteristic data held by the logger 103 during the not-yet-setup period.

Regarding the first and second problems, in the present embodiment, even if there are a small number of diagnosis parameters calculated based on the sensing data output from the sensor 905 during the adjustment period, sufficient amount of underlying data can be the ensured by adding to the underlying data the estimated diagnosis parameter in the not-yet-setup period. This allows correct diagnosis criteria to be set in a short adjustment period.

Regarding the third problem, in the present embodiment, even if the state of the monitoring target device is skewed during adjustment period, the skewness of the underlying data can be reduced by estimating the diagnosis parameter in the not-yet-setup period and adding it to the underlying data. This allows correct diagnosis criteria to be set.

Regarding the fourth problem, in the present embodiment, if the regression model is accurate, sufficient amount of diagnosis parameters can be estimated from the characteristic data, accumulated in the logger, and added to the underlying data. This allows the adjustment period to be ended at an appropriate time by evaluating the performance of the regression model.

(Procedure for Adjustment)

Figure 5:
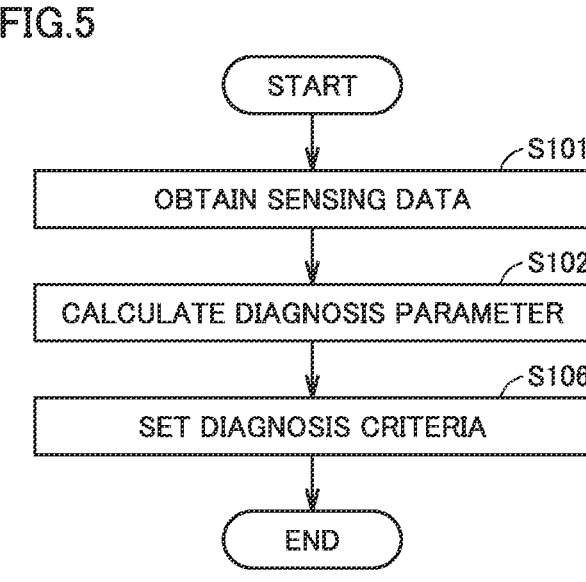
FIG. 5 is a flowchart representing process steps performed by the general state-monitoring system in an adjusting state.
Figure 6:
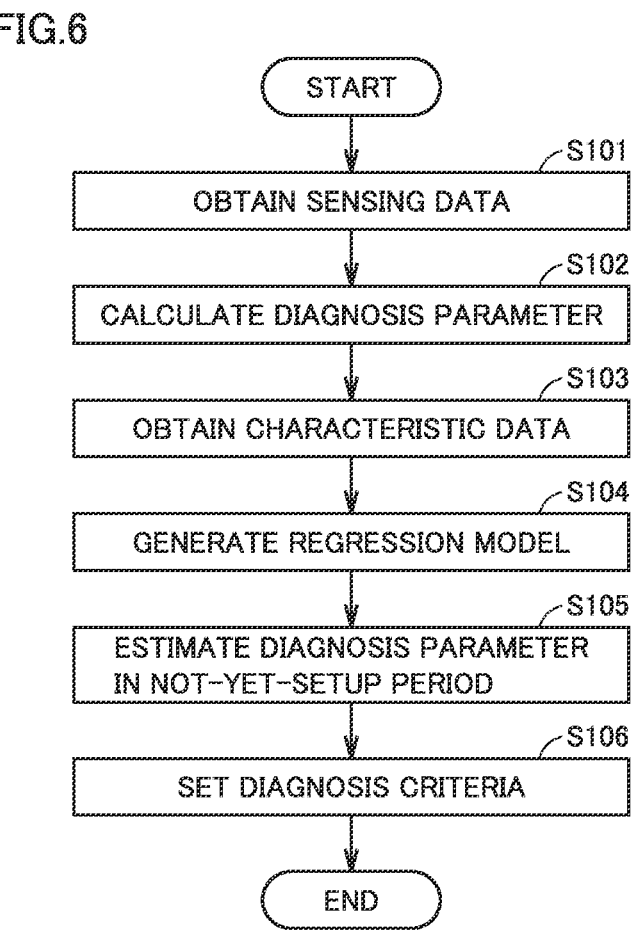
FIG. 6 is a flowchart representing process steps performed by the state-monitoring system according to Embodiment 1 in an adjusting state.

FIG. 5 is a flowchart representing process steps performed by the general state-monitoring system in the adjusting state. FIG. 6 is a flowchart representing process steps performed by the state-monitoring system according to Embodiment 1 in the adjusting state. The state-monitoring system can transition to the not-yet-setup state at any time during the adjusting state in response to the removal, which is therefore not described in these flowcharts.

As shown in FIG. 5, the process steps performed by the general state-monitoring system in the adjusting state include steps S101, S102, and S106. As shown in FIG. 6, the process steps performed by the state-monitoring system according to the present embodiment in the adjusting state include steps S101 through S106.

Referring to FIG. 6, in step S101, the sensing-data input unit 906 collects the sensing data representing the state of the monitoring target device 101 output from the sensor 905 mounted on the monitoring target device 101 in the adjustment period (measurement of data). The sensing data obtained by the sensor 905 is, for example, data from an acceleration sensor, a current sensor, a volmeter, a color sensor, an orientation sensor, a wind-velocity sensor, a flow sensor, a pressure sensor, or a proximity sensor.

In step S102, the diagnosis-parameter calculation unit 907 calculates the diagnosis parameter in the adjustment period, based on the sensing data obtained during the adjustment period. The diagnosis parameter is not only the data detected by the sensor 905 as is, but also statistics of the data detected by the sensor 905, such as a root mean square, a modulation value, an average, a median, a kurtosis, and a skewness, an amount of electric power that is determined by multiplying the current value and the rated voltage, time differences between inputs of proximity sensors mounted at multiple locations of a conveyer included in the monitoring target device 101, and physical quantities such as the speed of an conveyed article determined from the distances between these proximity sensors.

In step S103, the characteristic-data input unit 104 obtains, from the logger 103 included in the monitoring target device 101, the characteristic data representing the characteristics of the monitoring target device 101 in the not-yet-setup period and in the adjustment period. Examples of the characteristic data of the monitoring target device 101 include the pressure, the temperature, the rotational speed, the current value, the flow rate, or the maintenance information of the monitoring target device. Where the monitoring target device 101 is wind power generation equipment, examples of the characteristic data include the wind direction, the wind velocity, the weather, or the air pressure. Where the monitoring target device 101 is a machine tool, examples of the characteristic data include the type of a machined work, the type of machining process, the tool information, or the type of material.

In step S104, using the characteristic data in the adjustment period and the diagnosis parameter in the adjustment period, the regression-model generation unit 105 generates the regression model representing a relationship between the characteristic data and the diagnosis parameter. The regression model is various neural networks such as a simple regression model (single regression), multiple regression model (multiple regression), a feedforward neural network, or a radial basis function (RBF) network.

In step S105, using the regression model, the diagnosis-parameter estimation unit 106 estimates the diagnosis parameter in the not-yet-setup period, which corresponds to the characteristic data in the not-yet-setup period.

In step S106, the diagnosis-criteria setting unit 109 creates the diagnosis criteria from the underlying data consisting of the diagnosis parameter in the not-yet-setup period and the diagnosis parameter in the adjustment period. The diagnosis criteria are a threshold or an adjusted neural network. The threshold is, for example, the average of the underlying data multiplied by a constant multiple (e.g., 3) of the standard deviation of the underlying data (Specific Example of Adjustment)

One example where the monitoring target device 101 is the wind power generation equipment is now illustrated as a specific example of the adjustment. A vibration sensor is mounted on a step-up gearbox in the wind power generation equipment.

In step S101, in the adjustment period, the sensing-data input unit 906 collects vibration data representing the vibrating state of the monitoring target device 101, which is output from the vibration sensor mounted on the monitoring target device 101.

In step S102, the diagnosis-parameter calculation unit 907 calculates, as a diagnosis parameter, a vibration root mean square in the adjustment period from the vibration data obtained in the adjustment period.

In step S103, as the characteristic data of the wind power generation equipment, the characteristic-data input unit 104 obtains, from the logger 103 included in the monitoring target device 101, the main shaft's rotational speeds in the not-yet-setup period and the adjustment period which are saved in a control device of the wind power generation equipment.

In step S104, using the characteristic data (the main shaft's rotational speed) in the adjustment period and the diagnosis parameter (the vibration root mean square) in the adjustment period, the regression-model generation unit 105 generates a second-order polynomial regression model representing the relationship between the characteristic data and the diagnosis parameter.

In step S105, using the second-order polynomial regression model, the diagnosis-parameter estimation unit 106 estimates the diagnosis parameter (the vibration root mean square) in the not-yet-setup period, which corresponds to the characteristic data (the main shaft's rotational speed) in the not-yet-setup period.

In step S106, the diagnosis-criteria setting unit 909 creates diagnosis criteria, consisting of a first threshold Th1 and a second threshold Th2, from the underlying data consisting of the vibration root mean square in the not-yet-setup period and the vibration root mean square in the adjustment period. The first threshold Th1 and the second threshold Th2 are represented as follows:

$$Th1 = \mu + a \times \sigma \qquad (1)$$

$$Th2 = \mu + a \times \sigma \times n \qquad (2)$$

where $\sigma$ and $\mu$ are the standard deviation and the average, respectively, of the underlying data, a is any real number, and n is any constant greater than one. For example, a=3 and n=2 may be set.

(Example of Data)

Figure 7:
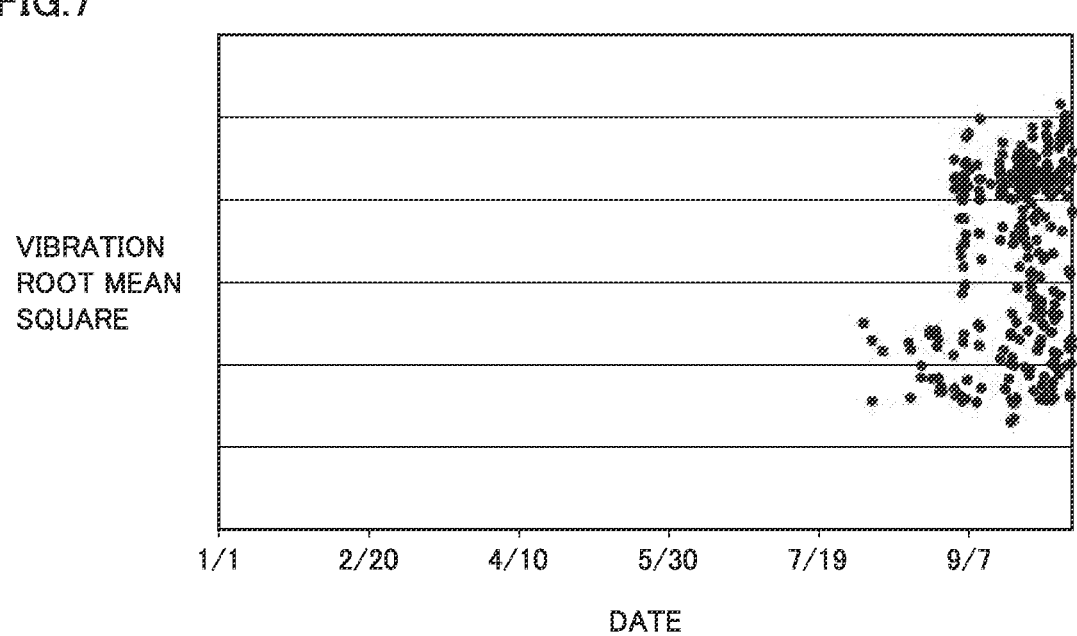
FIG. 7 is a diagram representing changes in diagnosis parameter after the state-monitoring device is set up.
Figure 8:
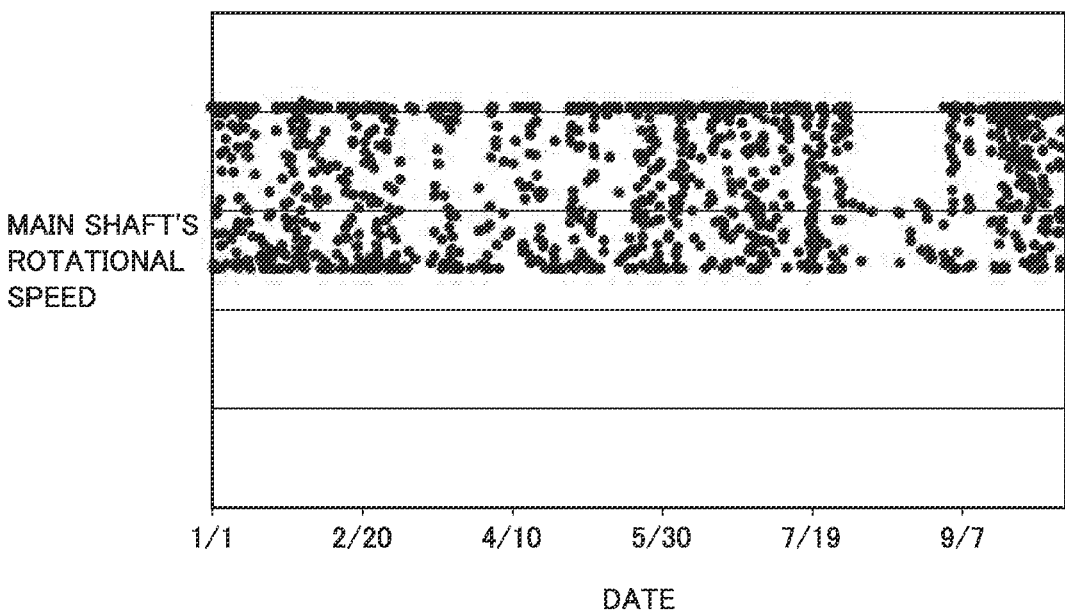
FIG. 8 is a diagram representing MAIN SHAFT'S rotational speed data for wind power generation equipment saved in SCADA.

FIG. 7 is a diagram representing transition of the diagnosis parameter after the state-monitoring device is set up. Suppose that the state-monitoring device is set up on August 1 st FIG. 8 is a diagram representing the data of the main shaft's rotational speed of the wind power generation equipment saved in SCADA. During a month (August 1st through September 1st) after the state-monitoring device is set up, the revolutions per minute (rpm) of the main shaft of a wind mill continues low, and the vibration root mean square (the diagnosis parameter) is measured only when the main shaft rpm is low. Due to this, with a general method, correct diagnosis criteria cannot be set without the vibration sensor measuring the vibration data over a month after the state-monitoring device is set up.

Figure 9:
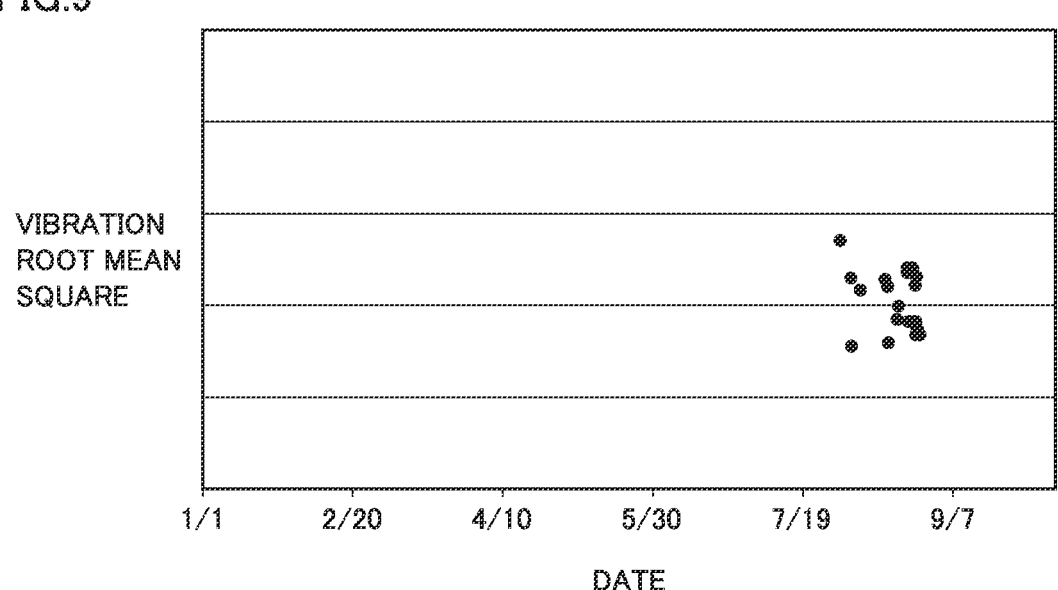
FIG. 9 is a diagram representing changes in diagnosis parameter during the adjustment period, according to Embodiment 1.

FIG. 9 is a diagram representing changes in diagnosis parameter during the adjustment period, according to Embodiment 1 Using the one month (August 1 st to September 1st) after the state-monitoring device is set up as the adjustment period, the vibration root mean square, which is the diagnosis parameter, is calculated from the sensing data obtained by the sensor 905 in this adjustment period.

Figure 10:
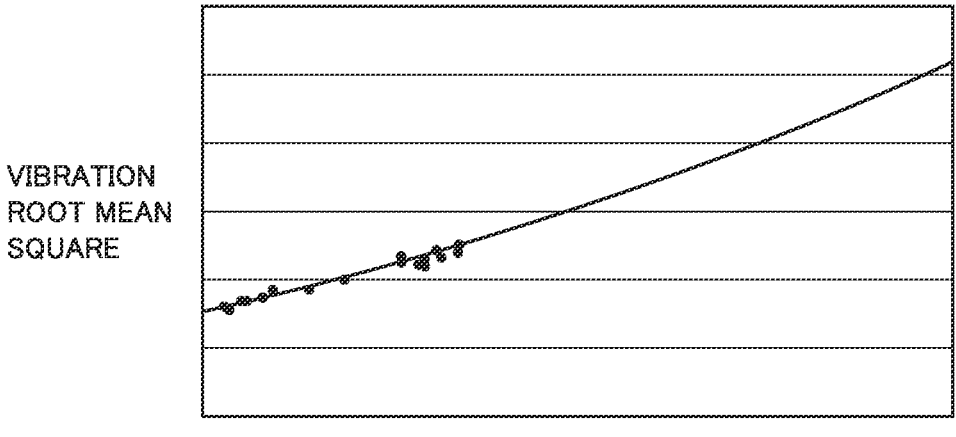
FIG. 10 is a diagram representing a second-order polynomial regression model according to Embodiment 1.

FIG. 10 is a diagram representing the second-order polynomial regression model according to Embodiment 1. Using a set of the vibration root mean square (the diagnosis parameter) and the main shaft's rotational speed (the characteristic data) in the adjustment period, which is the one month (August 1st to September 1st) after the state-monitoring device is set up, the second-order polynomial regression model is generated for estimating the vibration root mean square (the diagnosis parameter) from the main shaft's rotational speed (the characteristic data). Since the main shaft rpm is low during the adjustment period, the second-order polynomial regression model is generated from the low main shaft rpm and its corresponding vibration root mean square.

Figure 11:
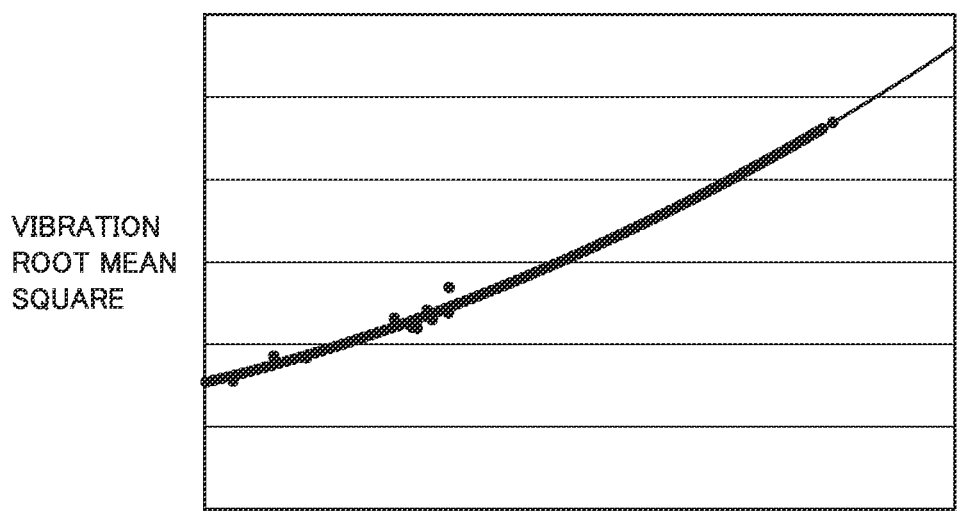
FIG. 11 is a diagram representing estimated diagnosis parameters.

FIG. 11 is a diagram representing the estimated diagnosis parameter. A vibration root mean square (the diagnosis parameter) corresponding to the main shaft rpm (the characteristic data) of the not-yet-setup period is obtained.

Figure 12:
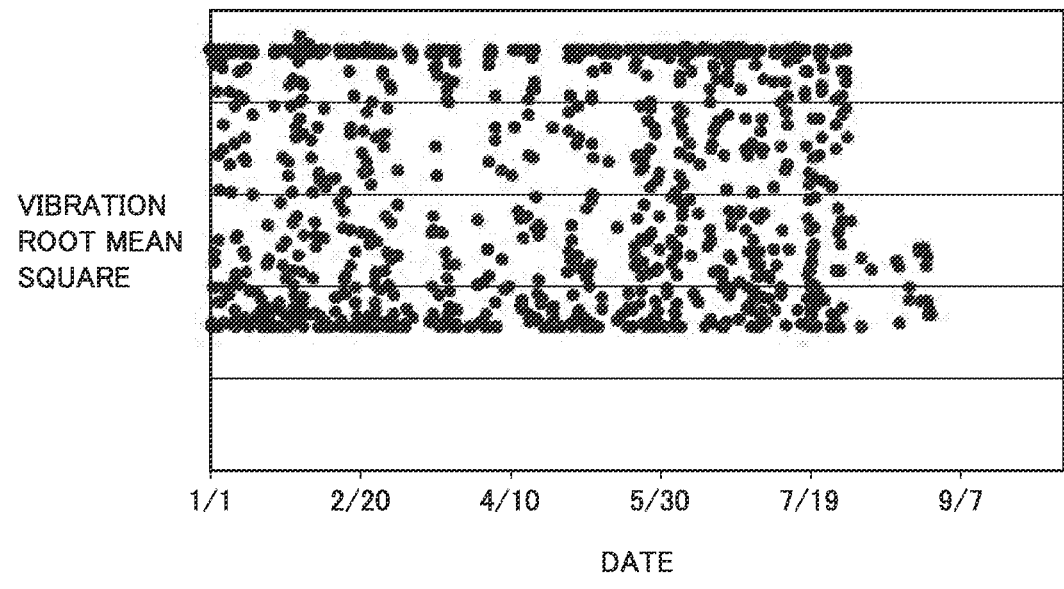
FIG. 12 is a diagram representing an example of underlying data.

FIG. 12 is a diagram representing an example of the underlying data. The underlying data consists of: the vibration root mean square (the diagnosis parameter) that is calculated from the sensing data obtained by the vibration sensor during the adjustment period; and the vibration root mean square (the diagnosis parameter) estimated during the not-yet-setup period, using the second-order polynomial regression model, from the main shaft rpm (the characteristic data).

Figure 13:
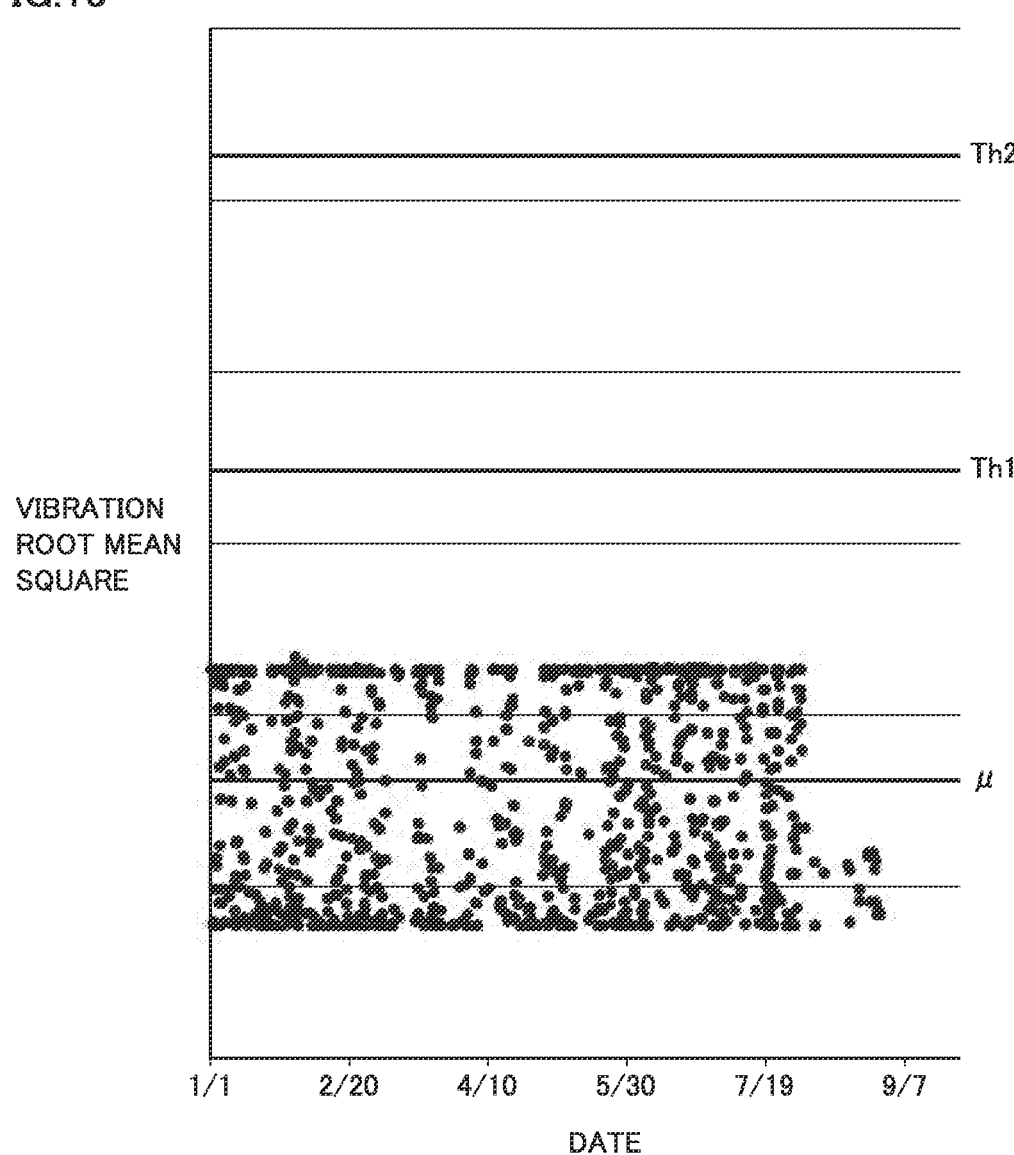
FIG. 13 is a diagram representing an example of the underlying data and diagnosis criteria.

FIG. 13 is a diagram representing an example of the underlying data and the diagnosis criteria. As shown in FIG. 13, the first threshold Th1 and the second threshold Th2, which are the diagnosis criteria, are set from the underlying data. Thus, in the present embodiment, in a month after the state-monitoring device is set up, the diagnosis criteria can be set and the state-monitoring device 102 can be caused to transition to the operating state.

Figure 14:
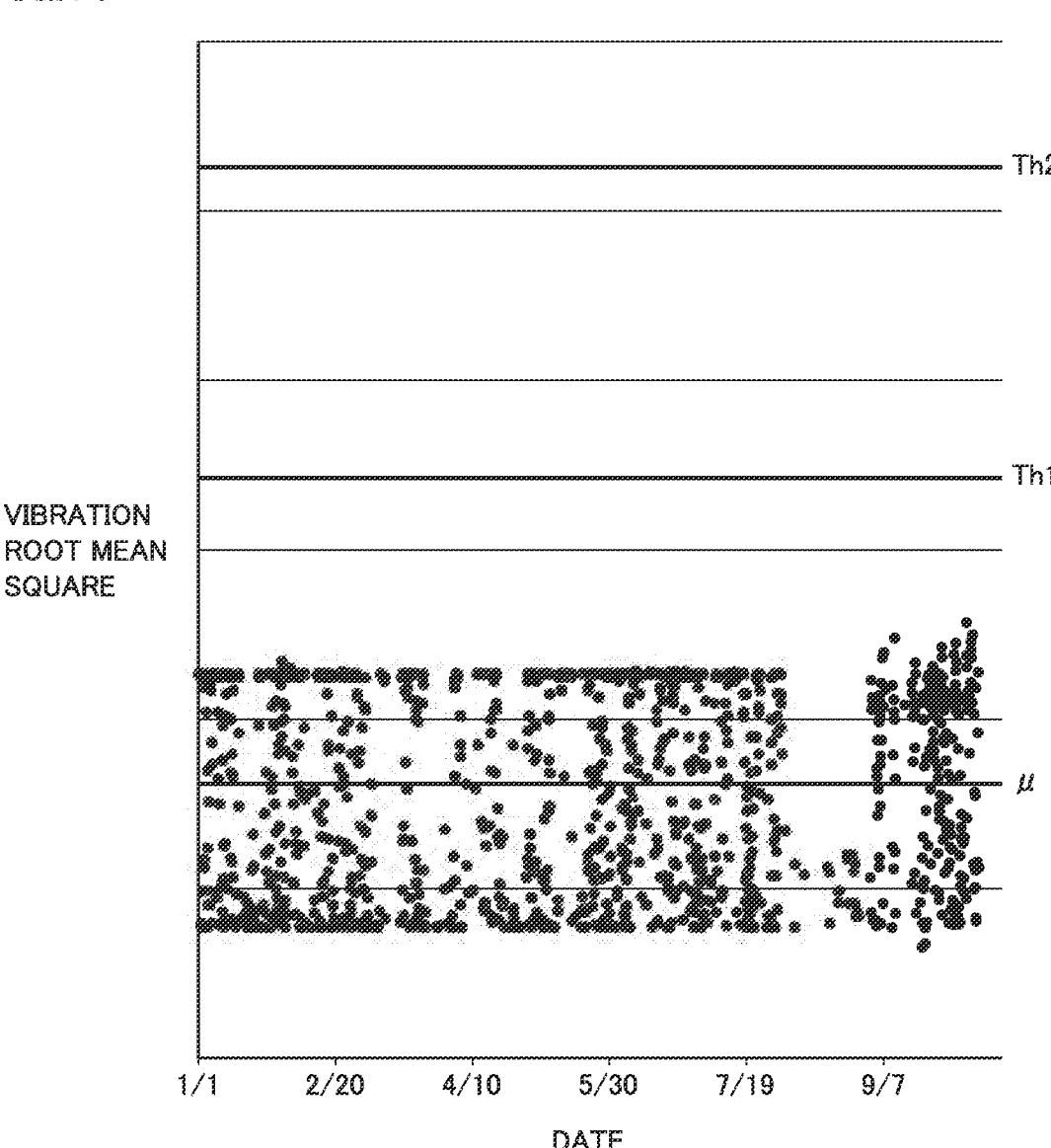
FIG. 14 is a diagram representing an example of the underlying data and diagnosis parameters during an operational period.

FIG. 14 is a diagram representing an example of the underlying data and the diagnosis parameter in the operational period. The operational period starts on September 1st. In the operational period, the vibration root mean square (the diagnosis parameter), obtained from the sensing data by the vibration sensor is compared with the first threshold Th1 and the second threshold Th2, and the monitoring target device 101 is thereby diagnosed.

(Operation)

FIG. 15 is a flowchart representing process steps performed by the state-monitoring system according to Embodiment 1 in the operating state.

The transition to the not-yet-setup state caused by the removal, and the transition to the adjusting state due to the state change can occur at any time during the operating state, which is therefore not described in the flowchart. Furthermore, the operating state continues as long as the remove or the state change does not occur. Thus, the end of the flowchart is not described either.

In step S301, in the operational period, the sensing-data input unit 906 collects the sensing data representing the state of the monitoring target device 101 output from the sensor 905 mounted on the monitoring target device 101.

In step S302, the diagnosis-parameter calculation unit 907 calculates the diagnosis parameter in the operational period, based on the sensing data obtained in the operational period.

In step S303, using the diagnosis criteria set in the adjustment period, the diagnostic unit 908 analyzes the diagnosis parameter calculated in step S302, thereby diagnosing the state of the monitoring target device 101.

In step S304, the output unit 910 outputs a diagnostic result to the state indicator 903.

(Diagnosis)

Examples of the method of diagnosis made by the diagnostic unit 908 include a method of diagnosis of the state of the monitoring target device 101 by comparing the diagnosis parameter with a threshold, a method of diagnosis by clusters categorized by clustering the diagnosis parameter, and a method in which the diagnosis parameter is input to an adjusted neural network and the output from the neural network is used as a diagnostic result.

In the following, a method will be described in which the diagnosis parameter is compared with a threshold and the state of the monitoring target device 101 is diagnosed per case.

FIG. 16 is a flowchart showing a procedure for diagnosis made by the state-monitoring system according to Embodiment 1.

In step S501, if the diagnosis parameter (x) is less than or equal to the first threshold (Th1), the process proceeds to step S503. If the diagnosis parameter (x) is greater than the first threshold (Th1), the process proceeds to step S502.

In step S502, if the diagnosis parameter (x) is less than or equal to the second threshold (Th2), the process proceeds to step S504. If the diagnosis parameter (x) is greater than the second threshold (Th2), the process proceeds to step S505.

In step S503, the diagnostic unit 908 determines that the monitoring target device 101 is in a "normal state." Being "normal" refers to a state in which the monitoring target device 101 has no abnormality.

In step S504, the diagnostic unit 908 determines that the monitoring target device 101 is in an "inspection required state." The "inspection required state" refers to a state in which the monitoring target device 101 has some indication of abnormality and inspection is required.

In step S505, the diagnostic unit 908 determines that the monitoring target device 101 is in a "pause required state." The "pause required state" refers to a state in which the monitoring target device may be damaged if the monitoring target device 101 continues to operate any further.

In the present embodiment, by exploiting the data present in the control device, etc., the diagnostic accuracy can be maintained even if the adjustment period is reduced. The reduction of the adjustment period allows reduction of a time lag from the setup of the state-monitoring device to the beginning of the diagnosis, thereby reducing the likelihood that an abnormality event is missed because it occurs before the diagnosis begins.

Embodiment 2

Figure 17:
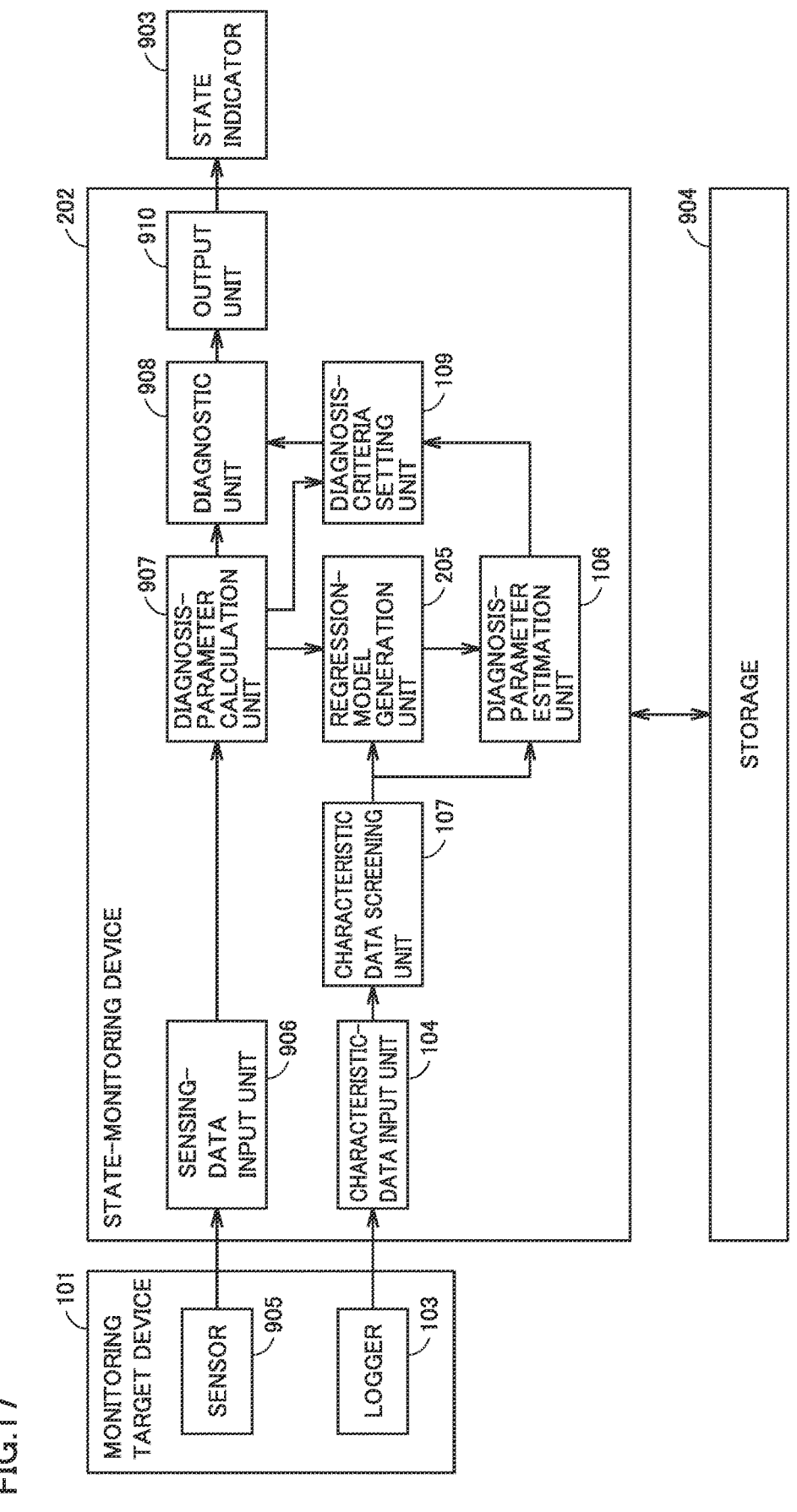
FIG. 17 is a diagram representing a configuration example of a state-monitoring system according to Embodiment 2.

FIG. 17 is a diagram representing a configuration example of a state-monitoring system according to Embodiment 2.

The state-monitoring system according to Embodiment 2 includes a characteristic data selection unit 107, in addition to the components of the state-monitoring system according to Embodiment 1, and includes a regression-model generation unit 205, instead of the regression-model generation unit 105.

The characteristic data selection unit 107 selects the characteristic data whose correlation coefficient with the diagnosis parameter in the second time period is greater than or equal to a threshold, from among the characteristic data items in multiple second time periods. For example, suppose that, where the diagnosis parameter is the vibration root mean square, the main shaft's rotational speed, the wind direction, and the wind volume are obtained as the characteristic data. The characteristic data selection unit 107 selects the main shaft's rotational speed if the correlation coefficient of the main shaft's rotational speed in the second time period with the vibration root mean square in the second time period is greater than or equal to the threshold, the correlation coefficient of the wind direction in the second time period with the vibration root mean square in the second time period is less than the threshold, and the correlation coefficient of the wind volume in the second time period with the vibration root mean square in the second time period is less than the threshold.

Using the selected characteristic data, the regression-model generation unit 205 generates the regression model.

FIG. 18 is a flowchart representing process steps performed by the state-monitoring system according to Embodiment 2 in the adjusting state. The flowchart according to Embodiment 2 of FIG. 18 is the same as the flowchart according to Embodiment 1 of FIG. 6, except that the flowchart according to Embodiment 2 of FIG. 18 includes step S201.

In step S201, the characteristic data selection unit 107 selects the characteristic data whose correlation coefficient with the diagnosis parameter in the second time period (the adjustment period) is greater than or equal to the threshold from among the characteristic data items in multiple second time periods (adjustment periods), and outputs the characteristic data to the regression-model generation unit 205.

According to the present embodiment, by using the characteristic data that has a high correlation with the diagnosis parameter, a precise regression model can be created.

Embodiment 3

Figure 19:
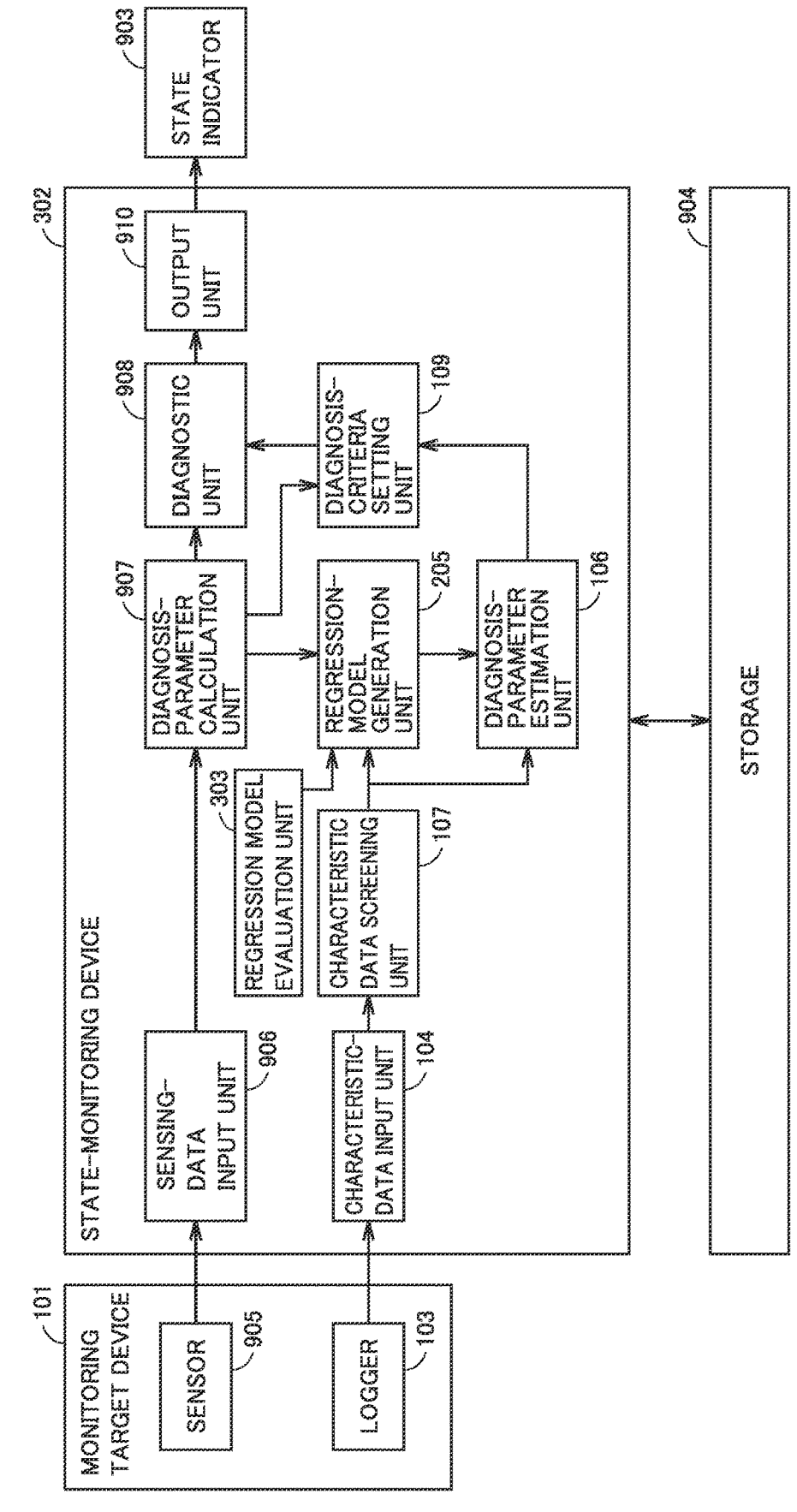
FIG. 19 is a diagram representing a configuration example of a state-monitoring system according to Embodiment 3.

FIG. 19 is a diagram representing a configuration example of a state-monitoring system according to Embodiment 3.

The state-monitoring system according to Embodiment 3 includes a regression model evaluation unit 303, in addition to the components of the state-monitoring system according to Embodiment 2.

The regression model evaluation unit 303 determines a score of the regression model, based on metrics. The metrics are, for example, accuracy, precision, recall, F-stop, mean-squared error, root mean square error, or coefficient of determination.

For example, the regression model evaluation unit 303 calculates a mean-squared error between: the diagnosis parameter calculated at a time ti in the adjustment period, which corresponds to the characteristic data at a time ti in the adjustment period; and the diagnosis parameter obtained by entering the characteristic data at the time ti to the regression model, where i=1 to n.

The acquisition of the sensing data by the sensing-data input unit 906, the calculation of the diagnosis parameter by the diagnosis-parameter calculation unit 907, the acquisition of the characteristic data by the characteristic-data input unit 104, and the generation of the regression model by the regression-model generation unit 205 are repeated until the score of the regression model reaches a predetermined value.

Figure 20:
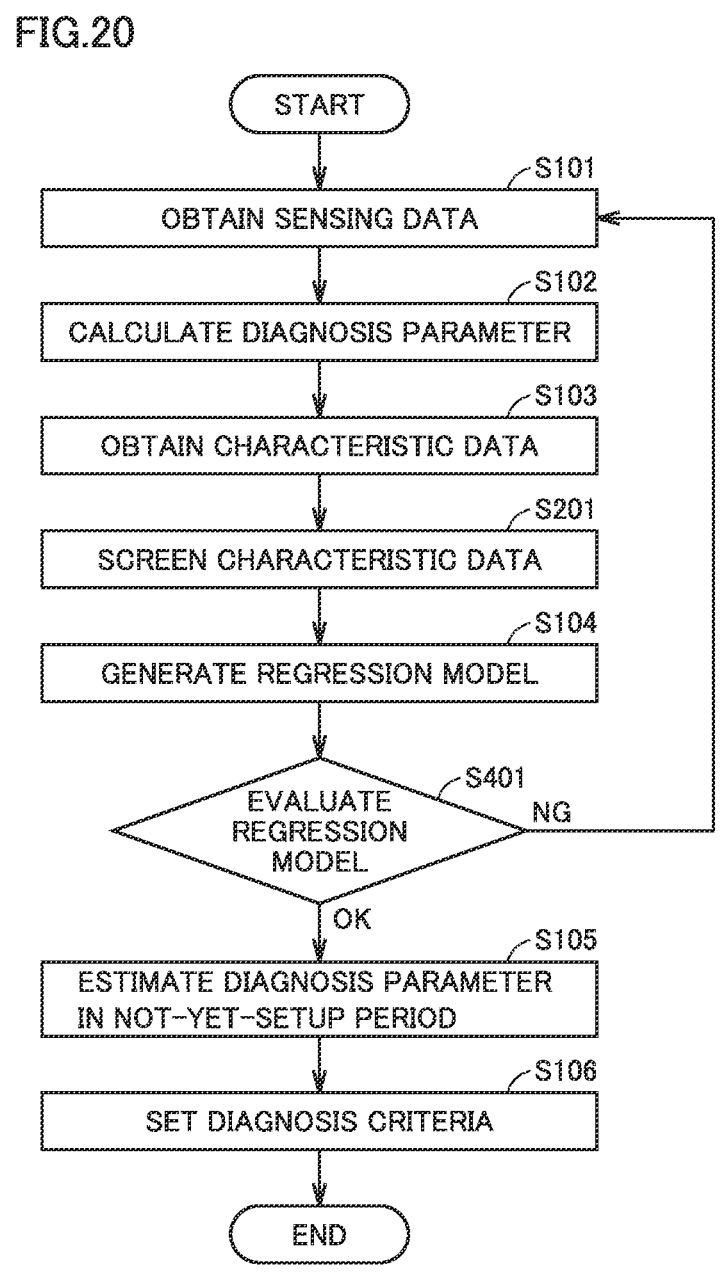

FIG. 20 is a flowchart representing process steps performed by the state-monitoring system according to Embodiment 3 in the adjusting state. The flowchart according to Embodiment 3 of FIG. 20 is the same as the flowchart according to Embodiment 2 of FIG. 18, except that the flowchart according to Embodiment 3 of FIG. 20 includes step S401 following step S105.

In step S401, the regression model evaluation unit 303 determines the score of the regression model, based on the metrics.

If the score of the regression model is greater than or equal to the predetermined value, the process proceeds to step S105. If the score of the regression model is less than the predetermined value, the process proceeds to step S101.

In the present embodiment, the time to end the adjustment period can be appropriately determined by evaluating the performance of the regression model. By appropriately determining the time to end the adjustment period, the risk of extending the adjustment period longer than necessary, and the risk of misdiagnosis caused by reducing the adjustment period shorter than a necessary length, can be reduced.

Embodiment 4

A state-monitoring system according to Embodiment 4 has a function of modifying the diagnosis criteria in the operational period.

Figure 21:
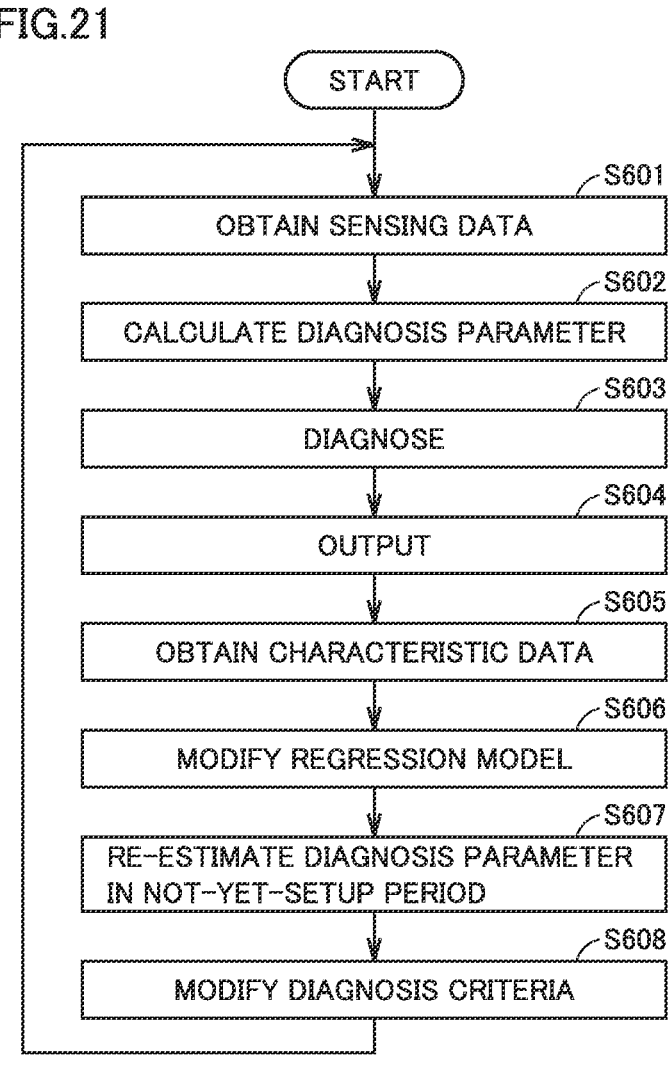
FIG. 21 is a flowchart representing process steps performed by a state-monitoring system according to Embodiment 4 in an operating state.

FIG. 21 is a flowchart representing process steps performed by the state-monitoring system according to Embodiment 4 in the operating state.

In step S601, in the operational period, the sensing-data input unit 906 collects the sensing data representing the state of the monitoring target device 101 output from the sensor 905 mounted on the monitoring target device 101.

In step S602, the diagnosis-parameter calculation unit 907 calculates the diagnosis parameter in the operational period, based on the sensing data in the operational period.

In step S603, using the diagnosis criteria set in the adjustment period or the diagnosis criteria modified in the operational period, the diagnostic unit 908 analyzes the diagnosis parameter calculated in step S602, thereby diagnosing the state of the monitoring target device 101.

In step S604, the output unit 910 outputs a diagnostic result to the state indicator 903.

In step S605, the characteristic-data input unit 104 obtains the characteristic data representing the characteristics of the monitoring target device 101 in the operational period, from the logger 103 included in the monitoring target device 101.

In step S606, using the characteristic data in the adjustment period and the operational period and the diagnosis parameters in the adjustment period and the operational period, the regression-model generation unit 205 modifies the regression model representing the relationship between the characteristic data and the diagnosis parameter.

In step S607, using the modified regression model, the diagnosis-parameter estimation unit 106 re-estimates the diagnosis parameter in the not-yet-setup period, which corresponds to the characteristic data in the not-yet-setup period.

In step S608, the diagnosis-criteria setting unit 109 modifies the diagnosis criteria from the underlying data consisting of, the diagnosis parameter in the not-yet-setup period; the diagnosis parameter in the adjustment period; and the diagnosis parameter in the operational period.

The presently disclosed embodiments should be considered in all aspects as illustrative and not restrictive. The scope of the present invention is defined by the appended claims, rather than by the description above. All changes which come within the meaning and range of equivalency of the appended claims are to be embraced within their scope.

REFERENCE SIGNS LIST 101, 901 monitoring target device; 102, 902 state-monitoring device; 103 logger; 104 characteristic-data input unit; 105, 205 regression-model generation unit; 106 diagnosis-parameter estimation unit; 107 characteristic data selection unit; 109, 909 diagnosis-criteria setting unit; 303 regression model evaluation unit; 903 state indicator, 904 storage; 905 sensor; 906 sensing-data input unit; 907 diagnosis-parameter calculation unit; 908 diagnostic unit; and 910 output unit.

The invention claimed is:

1. A state-monitoring device connectable to a monitoring target device, wherein a first time period, a second time period, and a third time period are set, the first time period being a time period before the monitoring target device is connected to the state-monitoring device, the second time period being an adjustment period, after the monitoring target device is connected to the state-monitoring device, for diagnosing abnormality of the monitoring target device, the third time period being a time period, after the monitoring target device is connected to the state-monitoring device, during which abnormality of the monitoring target device is diagnosed, the state-monitoring device comprising:
    a sensing-data input unit that obtains, during the second time period and the third time period, sensing data representing a state of the monitoring target device from a sensor included in the monitoring target device;

a diagnosis-parameter calculation unit that calculates a diagnosis parameter in the second time period and a diagnosis parameter in the third time period based respectively on the sensing data obtained during the second time period and on the sensing data obtained during the third time period;

a characteristic-data input unit that obtains characteristic data representing characteristics of the monitoring target device in the first time period and the second time period from a logger included in the monitoring target device;

a regression-model generation unit that generates, using the characteristic data in the second time period and the diagnosis parameter in the second time period, a regression model representing a relationship between the characteristic data and the diagnosis parameter;

a diagnosis-parameter estimation unit that estimates, using the regression model, a diagnosis parameter in the first time period, which corresponds to the characteristic data in the first time period;

a diagnosis-criteria setting unit that sets diagnosis criteria, using the diagnosis parameter in the first time period and the diagnosis parameter in the second time period; and a diagnostic unit that diagnoses abnormality of the monitoring target device, based on the diagnosis parameter in the third time period and the diagnosis criteria, wherein the monitoring target device is wind power generation equipment, and the sensor is a vibration sensor.

2. The state-monitoring device according to claim 1, further comprising a characteristic data selection unit that selects characteristic data whose correlation coefficient with the diagnosis parameter in the second time period is greater than or equal to a threshold, from among the characteristic data in a plurality of the second time periods, wherein the regression-model generation unit generates the regression model, using the selected characteristic data.

3. The state-monitoring device according to claim 1, further comprising a regression model evaluation unit that determines a score of the regression model, based on predetermined metrics, wherein acquisition of the sensing data, calculation of the diagnosis parameter, acquisition of the characteristic data, and generation of the regression model are repeated until the score of the regression model reaches a predetermined value.

4. The state-monitoring device according to claim 1, wherein the diagnosis parameter is a vibration root mean square, and the characteristic data is a rotational speed of a shaft.

5. The state-monitoring device according to claim 1, wherein the diagnosis-criteria setting unit creates diagnosis criteria which include a first threshold Th1, based on an average μ and a standard deviation σ of the diagnosis parameters in the first time period and the diagnosis parameters in the second time period, according to Equation:

$$Th1 = \mu + a \times \sigma \qquad (1)$$

where a is an any real number, and wherein the diagnostic unit determines that the monitoring target device is normal when the diagnosis parameter in the third time period is less than or equal to the first threshold Th1.

6. The state-monitoring device according to claim 5, wherein the diagnosis-criteria setting unit creates diagnosis criteria which include a second threshold Th2, based on the average μ and the standard deviation σ of the diagnosis parameters in the first time period and the diagnosis parameters in the second time period, according to Equation:

$$Th2 = \mu + a \times \sigma \times n \qquad (2)$$

where a is an any real number and n is any constant greater than one, and wherein the diagnostic unit determines that the monitoring target device is in an inspection required state when the diagnosis parameter in the third time period is greater than the first threshold and less than or equal to the second threshold.

7. The state-monitoring device according to claim 6, wherein the diagnostic unit determines that the monitoring target device is in a pause required state when the diagnosis parameter in the third time period is greater than the second threshold.

8. A state-monitoring method in a state-monitoring device connectable to a monitoring target device, wherein a first time period, a second time period, and a third time period are set, the first time period being a time period before the monitoring target device is connected to the state-monitoring device, the second time period being a preparation period, after the monitoring target device is connected to the state-monitoring device, for diagnosing abnormality of the monitoring target device, the third time period being a time period, after the monitoring target device is connected to the state-monitoring device, during which abnormality of the monitoring target device is diagnosed, the state-monitoring method comprising:

obtaining, by the state-monitoring device, during the second time period, sensing data representing a state of the monitoring target device from a sensor included in the monitoring target device;

calculating, by the state-monitoring device, a diagnosis parameter in the second time period based on the sensing data obtained during the second time period;

obtaining, by the state-monitoring device, characteristic data representing characteristics of the monitoring target device in the first time period and the second time period from a logger included in the monitoring target device;

generating, by the state-monitoring device, using the characteristic data in the second time period and the diagnosis parameter in the second time period, a regression model representing a relationship between the characteristic data and the diagnosis parameter;

estimating, by the state-monitoring device, using the regression model, a diagnosis parameter in the first time period, which corresponds to the characteristic data in the first time period;

setting, by the state-monitoring device, diagnosis criteria,
using the diagnosis parameter in the first time period
and the diagnosis parameter in the second time period;
and obtaining, by the state-monitoring device, during the third
time period, the sensing data representing the state of
the monitoring target device from the sensor included
in the monitoring target device;

calculating, by the state-monitoring device, a diagnosis
parameter in the third time period, based on the sensing
data obtained in the third time period; and diagnosing, by the state-monitoring device, abnormality
of the monitoring target device, based on the diagnosis
parameter in the third time period and the diagnosis
criteria, wherein the monitoring target device is wind power generation
equipment, and the sensor is a vibration sensor.

\* \* \* \* \*